June 24, 1930.   A. MOORHOUSE   1,766,925
MOTOR VEHICLE
Filed March 18, 1927   2 Sheets-Sheet 1
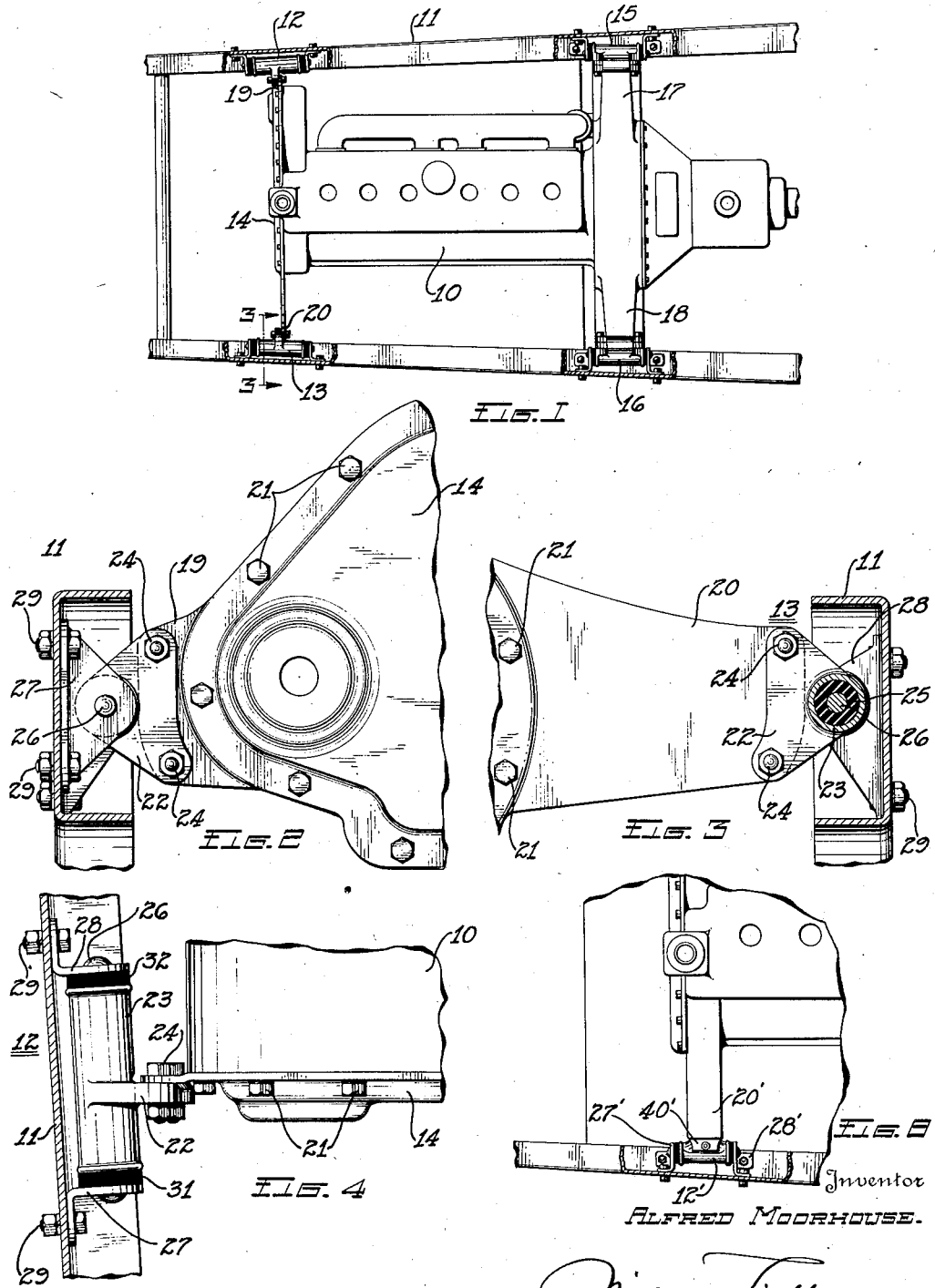
Inventor
ALFRED MOORHOUSE.
By
Attorney

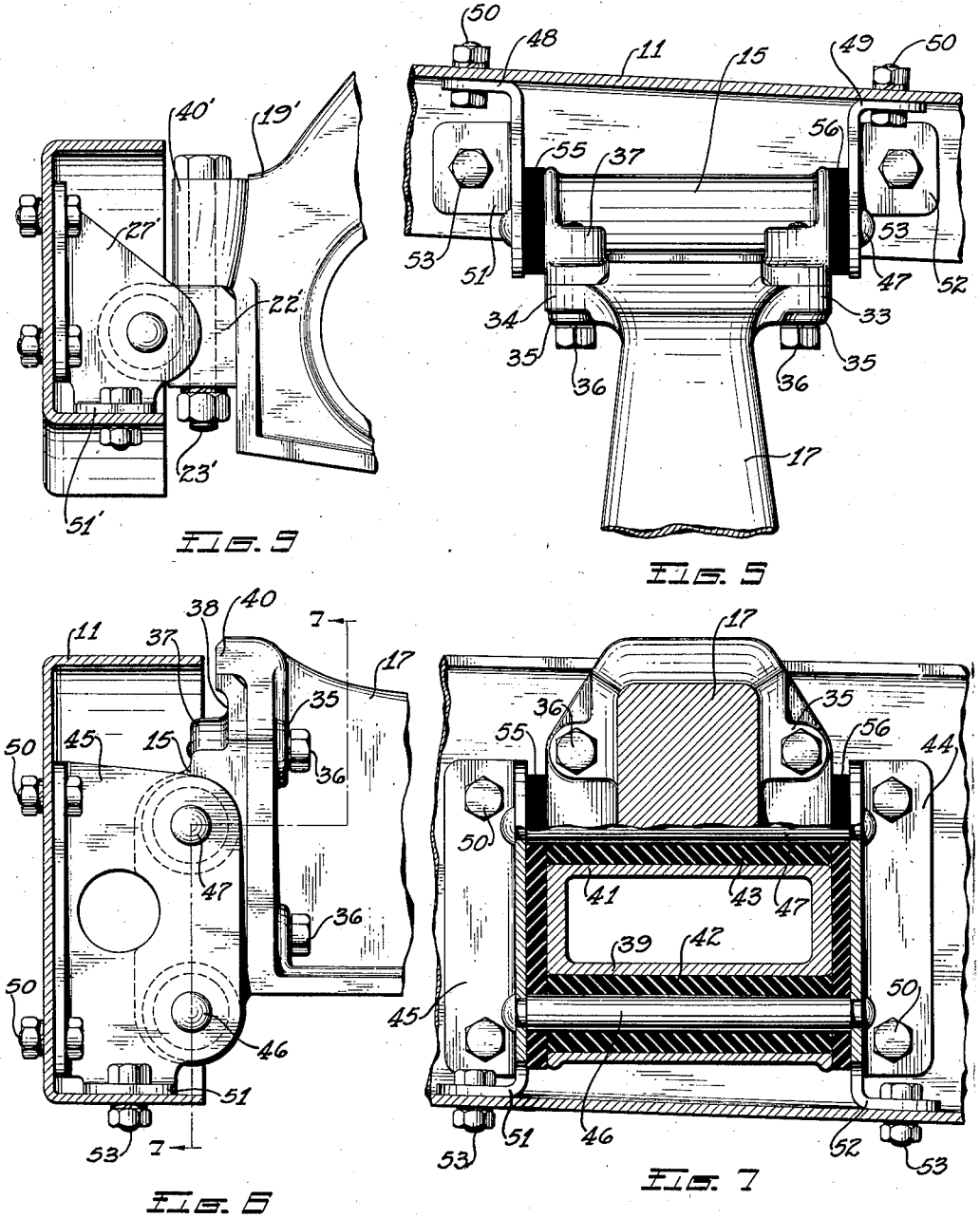

Patented June 24, 1930

1,766,925

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed March 18, 1927. Serial No. 176,369.

This invention relates to motor vehicles and more particularly to the engine and frame construction thereof.

An important problem in motor vehicle construction is that of eliminating the disagreeable effects of engine vibration, such vibration being the cause of discomfort to passengers and of serious wear and tear on the whole vehicle. A related problem is that of reducing stresses in the various parts of a motor vehicle that are caused by unavoidable jolting or shocks, transmitted via the wheels, springs and frame to the engine and other parts of the power plant, and caused by vibration of the engine itself.

An object of the present invention is to reduce the effects of engine vibration upon the frame and body of a motor vehicle by means of resilient supporting members.

A specific object is to yieldingly support the engine of a motor vehicle upon its frame in such manner as to reduce engine vibration and to prevent torsional deflection of the side frame members.

Another object is to yieldingly support the engine of a motor vehicle upon its frame, without setting up a twisting moment in the frame.

A further object is to so flexibly support the engine of a motor vehicle on the frame as to enable the engine to be readily removed without removing the supports.

A feature of the invention relates to resilient supports for the engine of a motor vehicle comprising brackets attached to the engine and frame which are detachable from the engine, whereby it may be lifted bodily from the supports.

Another feature relates to supporting brackets, including spools of resilient material positioned inside of the frame side rails, adapted to connect the engine crankcase to the frame, whereby vibration is reduced; whereby the crankcase is adapted to prevent torsional deflection of the side frame members; and whereby the load is applied directly to the side rails with substantially no twisting moment.

Another feature is a device comprising a flat plate rigidly attached to the crankcase of an engine, with arms attached to brackets on the frame, the brackets having one or more spools of resilient material adapted to dampen vibration and to reduce shocks.

An additional feature is a flexible mounting for the engine of a motor vehicle adapted to cause the crankcase of the engine to function as a cross member of the frame, whereby the provision of additional frame members is obviated.

Other features and objects of the invention will appear from the following description, taken in connection with the drawings, wherein like reference numerals have been used to indicate like parts, in the several figures, and wherein:

Fig. 1 is a plan view of the front end of the frame of a motor vehicle showing the engine mounted in accordance with this invention;

Fig. 2 is a partial front view of the supporting plate and bracket shown in Fig. 1;

Fig. 3 is a partial sectional view showing another arm of the front supporting plate taken on line 3—3 of Fig. 1;

Fig. 4 is a plan view of the device shown in Fig. 2;

Fig. 5 is a plan view showing a portion of a rear supporting arm with its bracket;

Fig. 6 is a side view of the device shown in Fig. 5;

Fig. 7 is a view in section on line 7—7 of Fig. 6;

Fig. 8 is a partial view showing a modification of the front supporting arm, and Fig. 9 is an enlarged side view of the supporting arm opposite to that shown in Fig. 8.

The structure shown in Fig. 1 includes an engine 10 yieldingly supported upon a frame 11 by means of front supporting brackets 12 and 13 attached to a front supporting plate 14, and by means of rear supporting brackets 15 and 16 attached to supporting arms 17 and 18, integral with the crankcase. The supporting brackets 12, 13, 15 and 16 are positioned inside of the side rails of the frame 11, whereby the weight of the engine is applied directly to the side rails, without producing any twisting moment, and the brackets 15 and 16 have double spools adapted to cause the crankcase to function as a cross member of the frame, as will more fully appear further on.

The brackets 12 and 13, which are substantially similar, and the supporting plate 14 are shown more in detail in Figs. 2 and 3. The plate 14, which carries the arms 19 and 20 may be stamped from a relatively thin plate of steel or similar material. This plate, or supporting member, is attached to the front of the engine crankcase by bolts 21. The bracket 12 includes a cylindrical sleeve 23 having an integral flange 22 extending laterally, which is attached to the arm 19 by suitable bolts 24. Within the sleeve 12 is positioned a hollow cylinder or spool 25 of resilient material, such as rubber, and a cylindrical pin 26 is inserted through the center of the spool, Fig. 3. The ends of the pin 26 pass through suitable holes in angle shaped members or brackets 27 and 28 positioned on opposite sides of the sleeve of the bracket 12. The pins 26 may be attached to the members 27 and 28, by riveting or in any other suitable manner. The brackets 27 and 28 are attached to the vertical web of the side frame member 11 by means of bolts 29. At opposite ends of the sleeve or bracket 12, washers 31 and 32 of resilient material are positioned over the pin 26 and between the sleeve and the respective members 27 and 28, to allow limited axial movement of the sleeves and to dampen vibration in an axial direction.

The members 27 and 28 are relatively short so that the sleeve portions of the brackets 12 and 13, and the pins 26 are positioned inside of the flanges of the side frame members, and hence the point at which the weight of the engine is applied, namely the axis of the pins, is inside of the frame channel members so that no material twisting moment thereon is produced, because the moment arm is extremely short.

The brackets 12 and 13 are detachable from the arms 19 and 20 at points outside of the frame by removal of the bolts 24, so that the engine may be dismounted by lifting it bodily from the frame. Otherwise it would be necessary to lengthen the angle members 27 and 28 to enable the brackets 12 and 13 to clear the frame and hence the twisting moment on the frame would be increased. Moreover, it would also be necessary to make the pins 26 removable, which would require the provision of a rigid extra sleeve in the rubber spool around the pins.

In Figs. 5, 6 and 7, the rear bracket 15 is shown in detail. The arm 17 of the engine crankcase includes oppositely disposed flange portions 33 and 34, provided with integral bosses 35 in which holes are provided. The bracket 15 includes a pair of cylindrical sleeves 39 and 41, Fig. 7, with a vertical flange portion 38, the outer periphery of which is curved, to engage the bottom face of a horizontal flange 40 at the top of the arm 17, for supporting the engine. The flange 38 includes integral bosses 37, in which holes are provided that are adapted to aline with the holes in the bosses 35, whereby the arm 17 may be attached to the bracket 15 by the bolts 36 inserted through these holes.

In the integral sleeve portions 39 and 41 of the bracket 15, Fig. 7, rubber spools 42 and 43 are positioned. These spools and the bracket 15 are supported on angle members 44 and 45, by means of the pins 46 and 47, passing through the center of the spools, in the same manner as described in Figs. 2, 3 and 4. The angle members 44 and 45 include vertical flange portions 48 and 49 attached to the vertical web of the side frame member 11 by means of bolts 50 and horizontal flanges 51 and 52 attached to the lower flange of the side frame member by bolts 53. Rubber bushings or washers 55 and 56 are positioned between the respective brackets 44 and 45 and the ends of the sleeves 39 and 41. The rubber spools allow limited vertical movement of the arm 17 and function to dampen the vibrations of this arm, whereby they are prevented from being transmitted to the frame through the bracket. A limited axial movement of the sleeves and arm 17 is permitted by the resilient washers 55 and 56, which also function to dampen the vibrations of the arm. The arm 18 is similar to the arm 17 and the bracket 16 is similar to the bracket 15 so they need not be further described.

The brackets 15 and 16 are detachable from the arms 17 and 18 so that these arms will clear the frame when the engine is lifted vertically from its supports. The brackets 15 and 16 being positioned permanently inside the frame, reduce the twisting moment and permit simplification of the resilient spools as explained in describing the front brackets.

Rotation of the arm or torsional deflection of the side frame members is prevented by the spaced arrangement of the pins, which are rigidly attached to the frame, in co-operation with the rubber spools, and the double sleeves rigidly attached to the arm 17.

A modification of the front supporting arms and brackets is shown in Figs. 8 and 9. The arm 20', Fig. 8, is integral with the engine crankcase as is also the arm 19', Fig. 9, so that the supporting plate 14 is eliminated. These arms each include a horizontally projecting flange 40', positioned on top of the flange 22' of the bracket 12'. The flanges 40' and 22' are rigidly attached together by a bolt 23'. In other respects, the modification shown in Figs. 8 and 9 does not differ materially from that shown in Figs.

2 and 3, except that the angle members 27' and 28' include horizontal flanges 51', which are bolted to the bottom flange of the side frame members.

In both forms, the weight of the engine is applied substantially directly to the side frame members and the spools of the supporting brackets are positioned inside of the side frame members, so as to avoid setting up any twisting moment. Likewise the rubber spools and washers function to dampen vibration of the engine frame and to prevent the transmission of this vibration to the side frame members.

The invention herein described has the advantage that increased riding comfort in the motor vehicle is secured by the elimination of noise and vibration, and in addition, the life of the entire vehicle is increased by eliminating strains caused by shocks and vibration.

Although this invention has been described in connection with certain specific embodiments, the principles involved are susceptible of numerous other applications that will readily occur to persons skilled in the art. The invention is therefore to be limited only as indicated by the scope of the appended claims.

What is claimed is:

1. In a motor vehicle, a frame member having a web and flanges, a bracket for said frame member secured to the web and one of the flanges, an engine for the vehicle and resilient connections between the bracket and engine positioned substantially within the limits of the flanges.

2. In a motor vehicle, a channel frame member, a bracket secured to the frame member, an engine for the vehicle, a member intermediate the bracket and engine, a resilient connection between the bracket and intermediate member positioned substantially within the limits of the channel frame member and a removable connection between the engine and intermediate member positioned without the limits of the channel frame member.

3. In a motor vehicle, in combination, a frame member, an engine for the vehicle having a supporting arm provided with a plurality of spaced sleeves, resilient members in the sleeves, and means for engaging the resilient members for securing the supporting arm to the frame member.

4. In a motor vehicle, in combination, a frame, an engine for the vehicle, and means for supporting the engine on the frame to prevent torsional deflection of the frame members, comprising supporting arms for the engine each having a plurality of resilient sleeves, and means for attaching the sleeves of each arm to a frame member close to the plane of said frame member.

5. In a motor vehicle, in combination, a frame having channel members, an engine for the vehicle, supporting arms for the engine each having a pair of parallel sleeves adjacent its outer end, resilient members in the sleeves, resilient members between the ends of the sleeves and the supporting arms and means engaging the resilient members for securing each supporting arm to a side frame member with the resilient members or sleeves positioned substantially within the limits of the side channel member.

6. In a motor vehicle, in combination, a frame, an engine for the vehicle, means supporting the engine on the frame to prevent torsional deflection of the frame comprising supports each having a plurality of parallel sleeves, resilient members positioned in the sleeves, and means for attaching the resilient members to the engine.

In testimony whereof I affix my signature.

ALFRED MOORHOUSE.